United States Patent

[11] 3,628,328

[72] Inventor Kenji Matsuzawa
 Yokohama, Japan
[21] Appl. No. 780,502
[22] Filed Dec. 2, 1968
[45] Patented Dec. 21, 1971
[73] Assignee Nissan Jidosha Kabushiki Kaisha
 Yokohama, Japan
[32] Priority Dec. 6, 1967
[33] Japan
[31] 42/78083

[54] DEVICE FOR AUTOMOBILES FOR PREVENTING AIR CONTAMINATION
 1 Claim, 12 Drawing Figs.
[52] U.S. Cl. .................................... 60/30,
 290/1, 310/62, 310/263
[51] Int. Cl. ............................................ F01n 3/10,
 H02k 9/06
[50] Field of Search ........................................... 60/30;
 290/1.3, 1; 310/62, 59, 68.4, 263

[56] References Cited
UNITED STATES PATENTS
3,517,504  6/1970  Sakamoto ..................... 60/30

*Primary Examiner*—Douglas Hart
*Attorney*—Sughrue, Rothwell, Mion, Zinn and Macpeak ABSTRACT: A device for automobiles for preventing air contamination by forcing compressed air to an engine exhaust manifold for reburning the incompletely burned components of the engine exhaust gas. The device comprises a compact air-pump-alternator consisting of an air pump portion and an alternator portion connected in series with the air pump along a common shaft. The air pump delivers compressed air generated thereby into the alternator for cooling. The compressed air, which is heated by cooling the alternator, is forced into the engine exhaust manifold for effectively reburning the incompletely burned components.

FIG_8
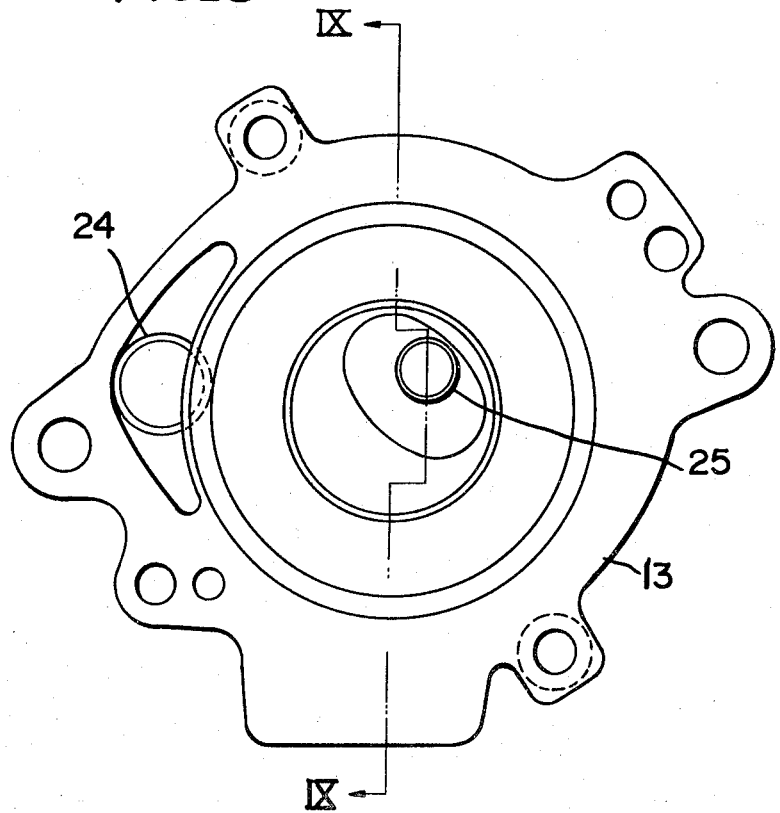
FIG_10
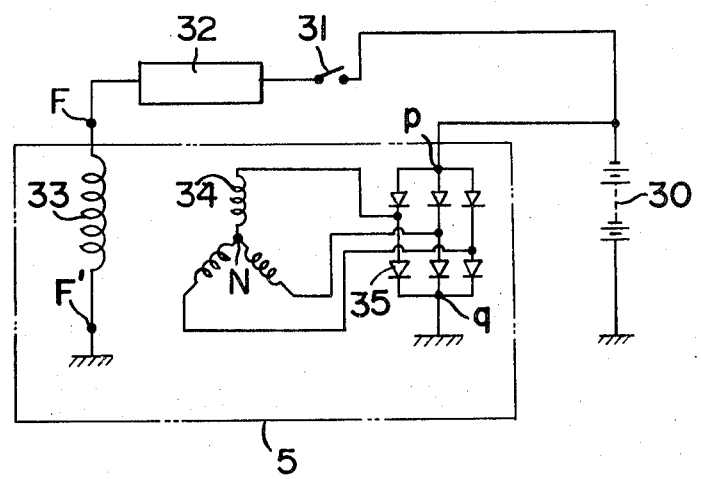

DEVICE FOR AUTOMOBILES FOR PREVENTING AIR CONTAMINATION

This invention relates to a device for automobiles for preventing air contamination, and more particularly to a device for automobiles for preventing air contamination having an air pump constructed integrally with an alternator.

In a known device for preventing air contamination by automobile exhaust gas, an air pump is mounted on an automobile engine, so as to deliver compressed air generated by the air pump into an engine exhaust manifold and to cleanse the engine exhaust gas by reburning the incompletely burned components thereof. Such known device has proved to be effective for preventing the air contamination.

In the actual setup of the known device for preventing air contamination, the air pump is mounted on one side of the automobile engine, while mounting an alternator at the opposite side thereof, so as to drive the air pump and the alternator separately by a crankshaft of the engine. With such setup, an extra transmission means, such pulleys and an endless belt, is necessary for driving the air pump by the engine crankshaft. Furthermore, the compressed air generated by the air pump is delivered to the engine exhaust manifold before being heated sufficiently for effectively reburning the incompletely burned components, while cooling the alternator by using a fan. Thus, the power driving the fan for cooling the alternator is wasted. In other words, the heat generated by the alternator is wasted during its cooling by a fan consuming a part of the engine output.

Therefore, an object of the present invention is to obviate such waste of power in known device for preventing air contamination, by providing a novel air contamination preventing device. In a device for preventing air contamination, according to the present invention, an alternator and an air pump are integrally formed in series with each other to form a composite air-pump-alternator. Accordingly, the thus combined air-pump-alternator can be driven by an automobile engine through a single transmission, and the compressed air generated by its air pump portion is forced to circulate through its alternator portion for cooling, and the compressed air heated by such cooling action is delivered to an engine exhaust manifold, so as to improve the efficiency in reburning the incompletely burned components of the exhaust gas.

For a better understanding of the invention, reference is made to the accompanying drawings, in which:

FIG. 1-A is a schematic plan view of a known automobile engine having a device for preventing air contamination by using air pump;

FIG. 1-B is a schematic front elevation of the engine of FIG. 1-A;

FIGS. 2-A and 2-B are a schematic plan view and a schematic elevation, respectively, illustrating an automobile engine having an air contamination preventing device mounted thereon;

FIG. 8 is an inner side view of the air-pump-alternator, taken from the inside of a rear cover thereof;

FIG. 10 is a circuit diagram of the electric circuitry of the air-pump-alternator, according to the present invention.

Like parts and members are designated by like numerals and symbols throughout the drawings.

Figure 1A:
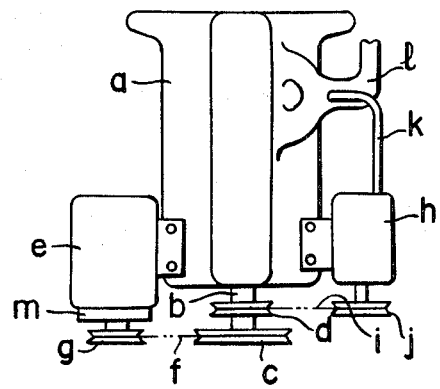
Figure 1B:
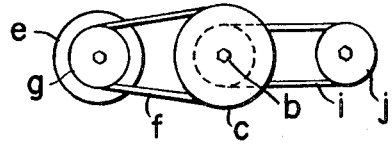

Referring to FIG. 1, illustrating a known air contamination preventing device, an automobile engine $a$ has a crankshaft $b$ with a pair of pulleys $c$ and $d$ secured thereto. An alternator $e$ is mounted on one sidewall of the automobile engine $a$ and actuated by the crankshaft $b$ through the pulley $c$, a belt $f$, and another pulley $g$. An air pump $h$ is mounted on the opposite sidewall of the engine $a$ and driven by the crankshaft $b$ through the pulley $d$, a belt $i$, and another pulley $j$. The compressed air generated by the air pump $h$ is delivered to the engine exhaust manifold $l$ through a tube $k$.

With the known construction having an alternator $e$ and an air pump $h$ separately mounted on an engine $a$, as shown in FIG. 1, extra transmission means, e.g. a pair of pulleys $c$, $d$ and a pair belts $f$, $i$ are necessary to actuate both the alternator $e$ and the air pump $h$. Furthermore, the alternator $e$ needs a fan $m$ for cooling the alternator because it generates heat by itself, while the air pump $h$ delivers compressed air into the engine exhaust manifold without materially heating it. Accordingly, the temperature of the compressed air fed to the exhaust manifold is too low to effectively reburn the incompletely burned gases there, despite the fact that extra power is used for driving the fan M to cool the alternator $e$. Thus, the known air contamination preventing device of FIG. 1 has a considerable amount of loss in power and heat.

Figure 2A:
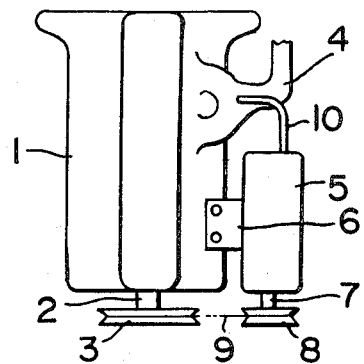
Figure 2B:
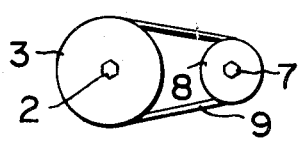

Referring to FIGS. 2-A and 2-B, illustrating an embodiment of the air contamination preventing device, according to the present invention, an automobile engine 1 has a crankshaft 2 extending to the front of the engine 1, an engine exhaust manifold 4, and a pulley 3 secured to the engine crankshaft 2.

In the device of the present invention, an alternator and an air pump are integrally constructed with their driving shafts connected in series, so as to form a composite air-pump-alternator 5, in which the compressed air generated by its air pump portion is forced to circulate through its alternator portion for cooling. The air-pump-alternator 5 is mounted on the automobile engine 1 through a bracket 6. A pulley 8 is mounted on a driving shaft 7, and belt 9 is spanned across the pulleys 3 and 8. The hot air, heated by the alternator while circulating therein for the purpose of cooling the alternator, is delivered to the exhaust manifold 4 through conduit 10.

FIGS. 3 to 9 illustrate the actual construction of an embodiment of the air-pump-alternator 5, according to the present invention. A body 11 holds both an alternator portion and an air pump portion separated from each other by an intermediate partitioning wall 11a located therebetween. A front cover 12 and a rear cover 13 are fitted on the body 11, and the aforesaid driving shaft 7 extends through the front cover 12 and the intermediate partitioning wall 11a, and an air pump rotor 14 is secured to the inner end of the driving shaft 7 by a bolt 40 and a washer 41. A key 42 is inserted between the shaft 7 and the air pump rotor 14. Bearings 15, 16, and 17 are inserted between the driving shaft 7 and the body 11, and an alternator rotor 18 is secured to the driving shaft 7 at an intermediate portion thereof. Alternator rings 19 are mechanically secured to the driving shaft 7 and electrically connected to the rotor 18, and an output terminal unit 21 is operatively connected to the rings 19 through brushes 20. Armature windings or coils 34 of stator 22 are secured to the inside surface of the body 11. A conduit connector 23 is mounted on the front cover 12 for connecting the conduit 10 to the air-pump-alternator 5, so as to extract the heated compressed air from the inside space of the alternator portion through the connector 23 and to deliver it to the engine exhaust manifold 4.

Another conduit connector 24 is mounted on the rear cover 13, so as to form an inlet opening to take fresh air into the air pump portion from an air cleaner (not shown) of the engine 1 mounted thereon. An eccentric shaft 25 is secured to the rear cover 13. Air pump vanes 26 are pivotally mounted to the eccentric shaft 25 through a bearing 43, and the movement of the vanes 26 is guide by vane guides 27 secured to the air pump rotor 14. An end disk 14a is secured to the air pump rotor 14 by bolts 44. The air fed to an intake chamber D (FIG. 7) of the air pump portion is forced into a compressed-air chamber E (FIG. 7), and then transferred to the alternator portion through a passage 28. A pressure-regulating valve 29 is operatively connected to the compressed-air chamber E.

In the electric circuit of the air-pump-alternator 5 of the present invention, as shown in FIG. 10, a field coil 33 of the alternator portion, having terminals F and F', is connected to batteries 30 through a relay 32 and a power source switch 31. Three phase armature coils 34 of the stator 22 are connected in star with the neutral N in common, and the star voltages are applied to a rectifier unit consisting of six silicon diodes 35. The DC terminals of the rectifier unit are designated by symbols $p$ and $q$.

Figure 3:
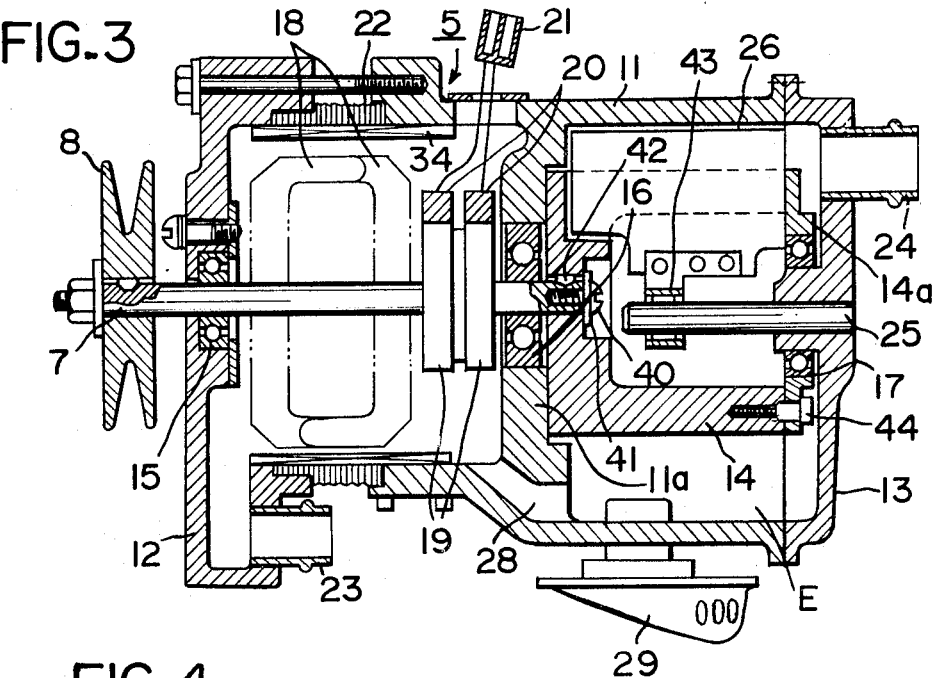
FIG. 3 is a longitudinal sectional view of an embodiment of an air-pump-alternator (a charging dynamo with air pump), according to the present invention.
Figure 4:
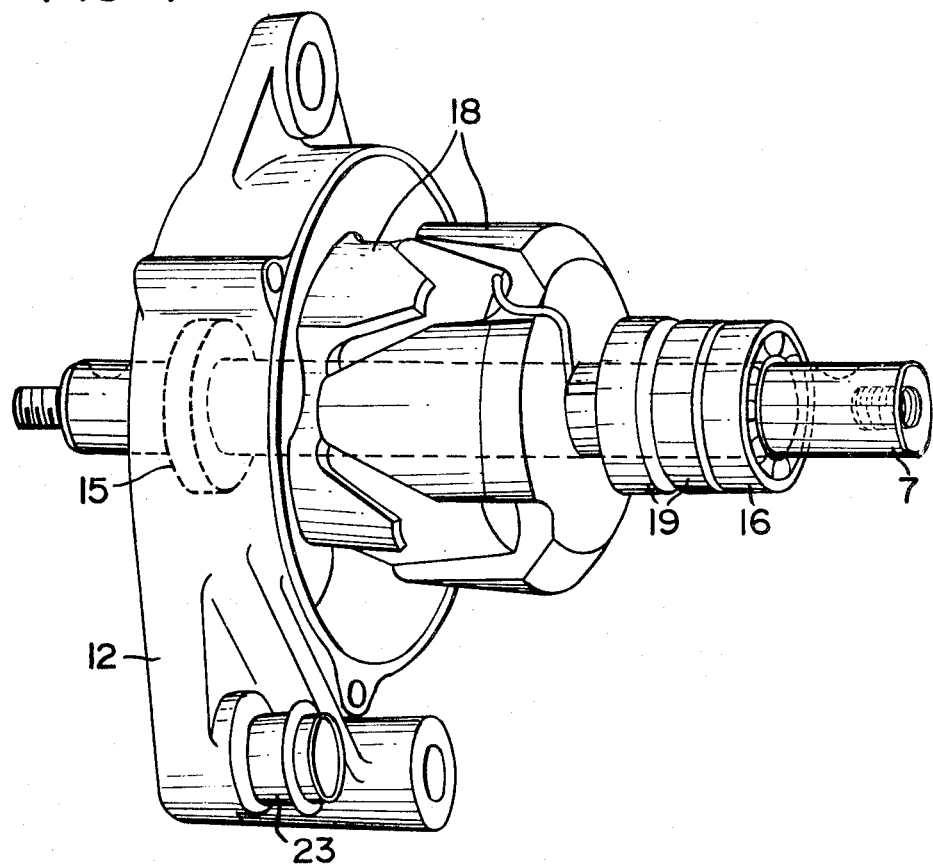
FIG. 4 is a perspective view of an alternator rotor portion of the air-pump-alternator of FIG. 3.
Figure 6:
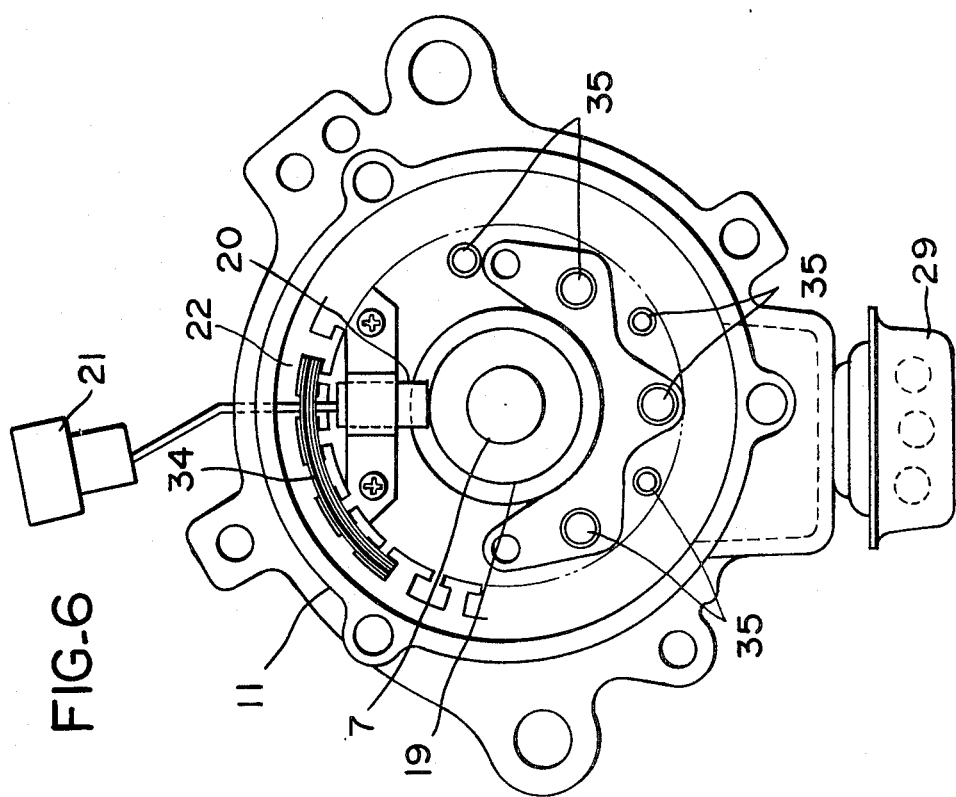
FIG. 6 is a front view of the air-pump-alternator, taken from the inside of the front cover of its body.
Figure 5:
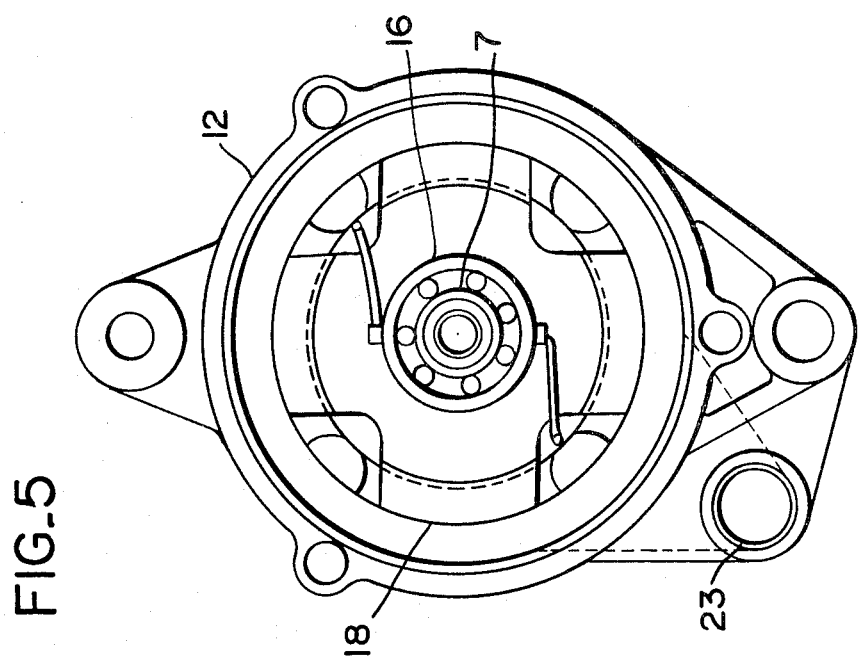
FIG. 5 is a side view of the alternator rotor of FIG. 4, taken from the right-hand side of FIG. 4.
Figure 9:
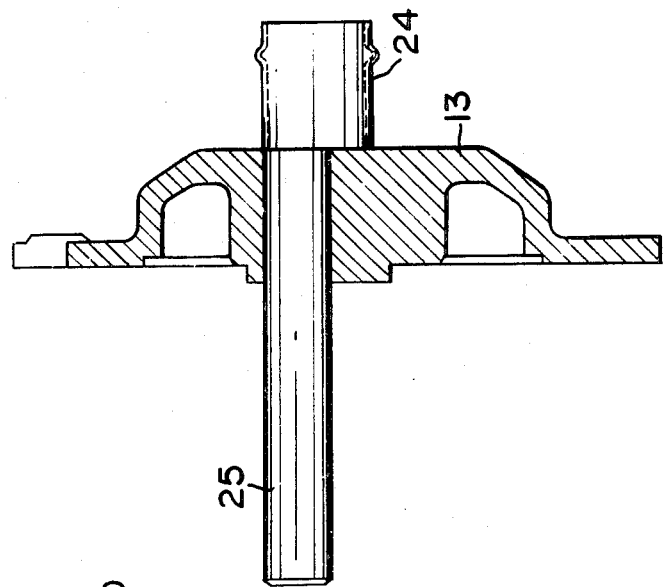
FIG. 9 is a sectional view, taken on the line IX—IX of FIG. 8.
Figure 7:
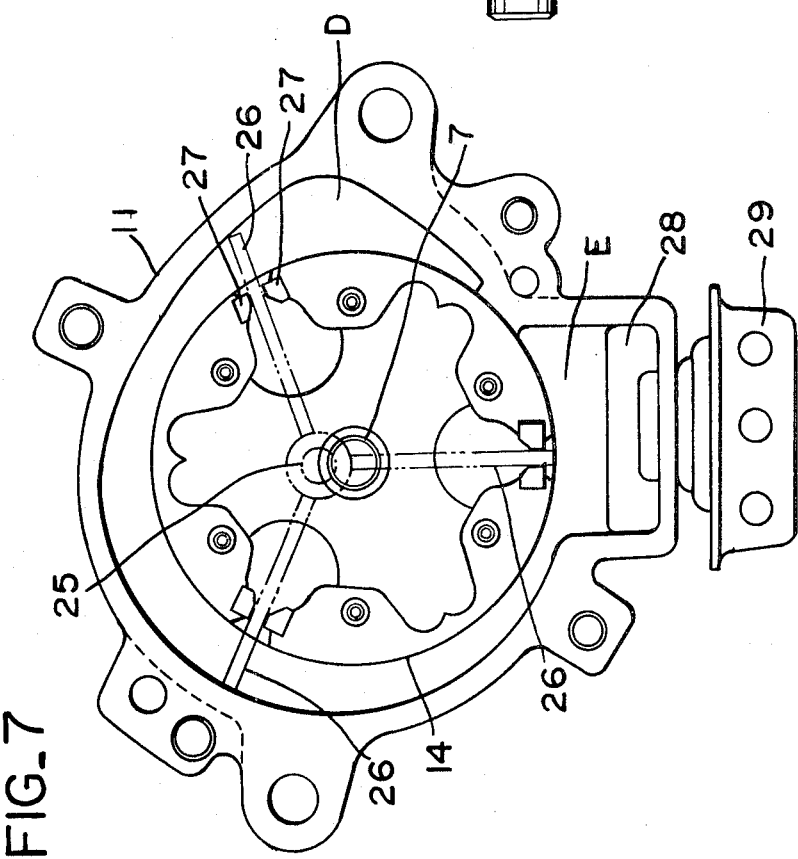
FIG. 7 is a rear view of the air-pump-alternator, with its rear cover, the end disk of its air pump, and its air pump vanes removed.

Referring to FIG. 3, an exciting current is fed from the batteries 30 to the field coil 33 of the rotor 18 through the terminal unit 21 including the coil terminals F and F', the brushes 20 and the rings 19. When the rotor 18 revolves with the exciting current flowing through the field coil 33, three phase alternating voltages are induced in the armature coils 34 of the stator 22. A DC voltage can be obtained across the terminals $p$ and $q$ of the rectifier unit consisting of the diodes 35 by rectifying the aforesaid three phase alternating voltages by the rectifying unit.

In operation of the air contamination preventing device of the aforesaid construction, when the automobile engine 1 is driven to rotate the crankshaft 2, the driving shaft 7 of the air-pump-alternator 5 is driven by the crankshaft 2 through the pulley 3, the belt 9, and the pulley 8. Thus, the alternator portion generates three phase alternating voltages, which are rectified by the rectifier unit for charging the batteries 30, in the aforesaid manner. At the same time, the air pump rotor 14 rotates in response to the rotation of the driving shaft 4, together with vanes 26. Accordingly, fresh air is sucked from an air cleaner (not shown) into the air intake chamber D through the conduit connector 24, and the air in the intake chamber D is compressed and forced into the compressed-air chamber E by the rotation of the vanes 26. The compressed air is then delivered to the alternator portion through the passage 28 bored through the intermediate partitioning wall 11a, so as to cool the alternator portion which generates heat. Thus, the alternator portion of the air-pump-alternator 5 of the present invention does not need any cooling fan mounted separately on the engine or on the alternator per se. Accordingly, power consumption by such cooling fan in conventional alternator can be eliminated completely. Moreover, by cooling the alternator, the compressed air is heated, and sufficiently preheated air is delivered to the engine exhaust manifold 4 through the conduit connector 23 and the conduit 10. As a result of it, incompletely burned components in the engine exhaust gas can be effectively reburned, and the air contamination due to the automobile engine exhaust gas can be prevented.

When the pressure in the compressed air chamber E exceeds a certain predetermined level, the pressure regulating valve 29 acts to discharge the excessive air. Thus, there is no risk of generating an excessively high air pressure, which consumes additional engine output power in vain. The discharge of the excessive air pressure also eliminates the possibility of the slipping of the belt 9 relative to the pulley 8 secured to the driving shaft 7 of the air-pump-alternator 5 for driving the air-pump-alternator 5.

With the construction described in detail in the foregoing, the air contamination preventing device according to the present invention has the following salient features.

1. The automobile engine exhaust gas can be effectively cleansed, because hot compressed air heated by an alternator portion of the air-pump-alternator is forced into the engine exhaust manifold for achieving complete reburning of the incompletely burned components in the exhaust gas.

2. The device can be constructed very light and in a very compact form, because only small air pump capacity is sufficient.

3. The device, particularly the alternator portion thereof, is free from troubles due to collection of dust particles from the atmosphere, because the device can preferably take fresh air through the air cleaner of the automobile engine. The power used in known automobile engine for driving a fan for cooling an alternator can be dispensed with.

In known automobile engines, the alternator is cooled by an airflow generated by a fan secured at one end thereof, and such airflow frequently brings dust particles to the alternators, and there have been frequent alternator troubles due to such dust particles.

4. The device can maintain a high availability of air ventilation of the engine room or engine chamber of automobile, because the air-pump-alternator can be made compact and causes little resistance against airflow in the engine chamber.

In known air contamination preventing device of the type using forced airflow into the engine exhaust manifold, the engine chamber of the automobile is congested and the ventilation of the engine chamber becomes ineffective, so that the temperature of the engine chamber tends to increase.

5. The device can be manufactured at low cost, because the power transmission means for driving the air-pump-alternator is simple. In known air contamination preventing device of similar type, four pulleys and two belts are necessary to drive both the alternator and the air pump, while with the device of the present invention two pulleys and a belt are sufficient for driving the air-pump-alternator thereof. In addition, the number of other related parts, such as bearings and holding means, can be reduced. Thereby, the engine weight can be reduced to improve its performance characteristics, and the manufacturing process can be simplified, and the cost of the parts and the engine can be reduced.

What is claimed is:

1. A composite air-pump-alternator for automobiles, comprising a substantially cylindrical body mountable on an automobile engine, a front cover mountable on one end of said body, a partition wall integrally formed within said body at a longitudinally intermediate position thereof, a first chamber defined in the body between said front cover and said partition wall, a drive shaft coaxially supported by the body so as to extend between said front cover and said partition wall, a pulley secured to the shaft at the front end thereof outside said front cover and connected by an endless belt with an output shaft of said automobile engine, a rotor with rotor windings integrally secured to said shaft, stator windings secured to the inner surface of said body in said first chamber so as to coact with said rotor windings, connecting means to connect said rotor winding and said stator windings to outside circuitry, a rear cover mounted to the opposite end of said body, a second chamber defined in said body between said rear cover and said partition wall, an air pump rotor coaxially secured to the opposite end of said drive shaft and being rotatable in said second chamber, an eccentric shaft mounted in said rear cover and extending into said second chamber, and having an axis offset from that of said drive shaft, a linear projection formed on inner surface of said second chamber and axially extending through said second chamber from said partition wall to said rear cover, said air pump rotor rotating about the axis of said shaft while airtightly sliding on the surface of said linear projection, air pump vane means rotatably mounted on said eccentric shaft and rotating together with said air pump rotor while keeping contact with the inner surface of said body in said second chamber to form at least two mutually isolated rotating spaces in said second chamber, an inlet opening located in said rear cover to allow air to be drawn into one of said isolated rotating spaces from the outside of said air-pump-alternator, a passage located through said partition wall so as to communicate said first chamber with said second chamber at another one of said isolated rotating spaces adjacent to said linear projection, an outlet opening located in said front cover to discharge air to the outside, and a pressure-regulating valve mounted on the air-pump-alternator in said second chamber adjacent said passage through said partition wall for relieving the air-pump-alternator from excessively high load due to high output pressure, whereby the air from said inlet opening is compressed in said second chamber and delivered to said first chamber for heating said air by cooling an electric generator comprised of said rotor windings and stator windings, so as to discharge hot compressed air to the outside of said air-pump-alternator.

* * * * *